United States Patent
Van Acht et al.

(10) Patent No.: US 9,213,627 B2
(45) Date of Patent: Dec. 15, 2015

(54) NON-VOLATILE MEMORY WITH BLOCK ERASABLE LOCATIONS

(75) Inventors: Victor M. G. Van Acht, Waalre (NL); Nicolaas Lambert, Waalre (NL)

(73) Assignee: NXP B.V., Eindhoven (NL)

( * ) Notice: Subject to any disclaimer, the term of this patent is extended or adjusted under 35 U.S.C. 154(b) by 2070 days.

(21) Appl. No.: 12/158,978

(22) PCT Filed: Dec. 13, 2006

(86) PCT No.: PCT/IB2006/054798
§ 371 (c)(1),
(2), (4) Date: Jun. 23, 2008

(87) PCT Pub. No.: WO2007/072317
PCT Pub. Date: Jun. 28, 2007

(65) Prior Publication Data
US 2008/0270681 A1   Oct. 30, 2008

(30) Foreign Application Priority Data
Dec. 21, 2005  (EP) ..................................... 05112626

(51) Int. Cl.
*G06F 12/02* (2006.01)

(52) U.S. Cl.
CPC .................................. *G06F 12/0246* (2013.01)

(58) Field of Classification Search
CPC .................................................. G06F 12/0246
USPC ...................................... 711/5, 140, 147, 169
See application file for complete search history.

(56) References Cited

U.S. PATENT DOCUMENTS

| | | | |
|---|---|---|---|
| 6,282,605 B1 * | 8/2001 | Moore | 711/103 |
| 6,711,663 B2 | 3/2004 | Lai et al. | |
| 6,725,321 B1 * | 4/2004 | Sinclair et al. | 711/103 |

(Continued)

FOREIGN PATENT DOCUMENTS

| | | |
|---|---|---|
| CN | 1258046 A | 6/2000 |
| CN | 1486462 A | 3/2004 |
| CN | 1514971 A | 7/2004 |

OTHER PUBLICATIONS

Jesung Kim; Jong Min Kim; Noh, S.H.; Sang Lyul Min; Yookun Cho;, "A space-efficient flash translation layer for CompactFlash systems," Consumer Electronics, IEEE Transactions on , vol. 48, No. 2, pp. 366-375, May 2002.*

(Continued)

*Primary Examiner* — Cheng-Yuan Tseng
*Assistant Examiner* — Ramon A Mercado

(57) ABSTRACT

A main memory (10) comprises a plurality of physical blocks of memory locations. The main memory (10) supports erasing of at least a physical block at a time. Pointer information is stored in a subset (40, 42) of the blocks for use to identify respective ones of the physical blocks that are assigned to respective functions. Successive versions of the pointing information are stored at mutually different memory locations initially in a first block (40) in the subset (40, 42). A subsequent version of the pointing information that is more recent than the successive versions is stored in a second block (42) of the subset (40, 42) at least after the first block (40) has been filled. The first block (40) is erased after storing the subsequent version. On start up of the main memory the pointing information is recovered by testing which of the blocks of the subset (40, 42) contains a most recent version of the pointing information.

20 Claims, 10 Drawing Sheets

(56) References Cited

U.S. PATENT DOCUMENTS

| | | |
|---|---|---|
| 6,839,798 B1 | 1/2005 | Nagayoshi et al. |
| 2004/0064629 A1 | 4/2004 | Kaku |
| 2011/0258386 A1 | 10/2011 | Conley |

OTHER PUBLICATIONS

Eran Gal and Sivan Toledo. 2005. Algorithms and data structures for flash memories. ACM Comput. Surv. 37, 2 (Jun. 2005), 138-163.*

Robert Sedgewick. 1998. Algorithms in C++, Parts 1-4: Fundamentals, Data Structure, Sorting, Searching, Third Edition (Third ed.). Addison-Wesley Professional.*

Kim, J; et al "A Space-Efficient Flash Translation Layer for Compactflash Systems" IEEE Transactions on Consumer Electronics, vol. 48, No. 2, May 2002, pp. 366-375.

Gal, E; et al "Algorithms and Data Structures for Flash Memories" ACM Computing Surveys, ACM, New York, vol. 37, No. 2, Jun. 2005, pp. 138-163.

* cited by examiner

NON-VOLATILE MEMORY WITH BLOCK ERASABLE LOCATIONS

FIELD OF THE INVENTION

The invention relates to a memory device and a method of operating such a device.

BACKGROUND OF THE INVENTION

U.S. Pat. No. 6,711,663 discloses a flash memory device. Data can be read from flash memory devices more or less as from any semi-conductor memory devices. Writing data is more complicated. Typically writing involves erasing a block of memory cells and subsequently programming pages of data to the erased block. Typically, erasing can be performed only collectively for an entire block, which therefore forms the unit of erasing in this case. Programming can usually be done in smaller units, by definition called pages.

Flash memory devices have the problem that they suffer from wear. Data blocks can be erased and programmed only a limited number of times before they wear out, after which they can no longer be used reliably. If blocks of a flash memory device for specific addresses would be erased and programmed far more often than others, the useful life of these blocks would limit the useful life of the flash memory device.

This problem has been addressed by using time-varying logical to physical address mapping. Mapping can be used to make it possible that a logical address that is used to access the flash memory can refer to locations in different physical blocks of the flash memory at different times. Thus, logical addresses for which frequent erasing and programming is needed can be remapped from time to time to different physical blocks, in order to avoid that the same physical block has to be erased and programmed each time when the logical block is erased and programmed (as used herein a "logical block" refers to the set of addresses that maps to the complete set of mappable addresses in a physical block, and optionally also loosely to the data stored in these locations).

Efficient logical to physical mapping requires a mapping table, which contains physical addresses stored according to the logical addresses to which they correspond. In principle such a mapping table has to be updated each time when a change in physical to logical address mapping is made. Conventionally, such a mapping table for a flash memory is stored in a RAM memory. On power up the mapping table is reconstructed from "tags" stored in the flash memory, which indicate for different physical memory regions (e.g. blocks) what their current logical address is.

U.S. Pat. No. 6,711,663 describes the use of a mapping table that is stored in the flash memory itself. U.S. Pat. No. 6,711,663 uses segment organized mapping. The memory is organized as a plurality of segments of blocks. A respective mapping table is provided for each segment, which translates logical addresses for the segment into physical addresses in the segment. The size of the segments is selected so that the size of each mapping table corresponds to a memory page, the unit of programming of the flash memory.

U.S. Pat. No. 6,711,663 provides a "memory update block" in each segment, for storing successive versions of the mapping table of the segment. The last programmed page of the memory update block is used as mapping table. Each time when the mapping table of the segment has been changed the updated mapping table is programmed in a next page of the memory update block. After each change a new page is used to store the mapping table until all pages of the memory update block have been programmed. When a next update of the memory table occurs after all pages have been programmed, the memory update block is erased and the new memory table is written into the first page of the erased block.

This approach has the advantage that on power up no time is needed to reconstruct the mapping table from tags. Instead the mapping table can be retrieved directly from the flash memory.

However, if an interruption, like disconnection from the power supply has occurred after erasing the memory update block and before programming of the first new mapping table, such a retrieval is impossible. In this case a time-consuming tag based reconstruction of the mapping is needed.

SUMMARY OF THE INVENTION

Among others it is an object to provide for a memory device that stores a mapping table and which does not require significantly increased time for generating the mapping table after interruptions.

An apparatus according to claim 1 is provided. Herein successive versions of pointing information are stored at mutually different memory locations in a first and second block in the main memory (for example a flash memory). The pointing information points to physical blocks in the main memory indicating that the physical blocks store data for certain functions (for example that the physical blocks store data for respective logical addresses, or pointers to other blocks etc.). The mapping control circuit erases the first block, after storing a latest version of the pointing information in a second block. On start up the mapping control circuit recovers the pointing information by testing which block in a predefined subset of all blocks of the main memory contains the last version of the pointing information. The first and second blocks are part of the subset. In this way the apparatus is robust against power down interruptions during updates of the pointing information. In one embodiment the subset consists of the first and second block, but in an alternative embodiment the subset may also contain further blocks of the main memory, which may for example also be used as first or second block in turn at other times; in each case the subset is much smaller than the set of all blocks, the subset containing no more than say four or sixteen blocks. A predetermined subset may be used, but in an embodiment the mapping control circuit stores information in the main memory to identify the blocks in the subset.

In an embodiment writing to the second block starts only when the first block is full. In this, or another embodiment the mapping control circuit exchanges the roles of the first and second block after erasing the first block. When the subset contains more blocks, another block from the subset may take on the role of the second block.

In an embodiment testing is performed by searching in the sub-set for a partly filled block that has only partly been written and using the last written version of the pointing information from that partly filled block, and to use a last written version of the pointing information from a full block if no partly filled block is found.

In an embodiment the mapping control circuit writes version numbers in the blocks accompanying the versions of the pointing information. In this embodiment the mapping control circuit identifies the latest version of the pointing information from the version number. In another embodiment the versions of the pointing information are stored in the first blocks and subsequently in the second block with starting addresses having a sequence corresponding to the sequence in which the versions are generated. In this case the mapping control circuit searches for the version with the sequentially last address, e.g. by first searching in the second block and if that does not contain any (complete) version in the first block, or by first searching in the first block and if that is full, testing the second block whether the second block is empty.

In an embodiment the pointing information comprises a mapping table that maps logical addresses to respective ones of the blocks or groups of blocks. In a further embodiment the mapping control circuit stores versions of mapping table parts for respective segments of a logical address space independently of one another in blocks of the main memory. In a further embodiment the mapping control circuit stores the versions of the mapping table parts for different ones of the segments mixed with one another in the first block, copies latest versions of the mapping table parts for which no versions are stored in the second block of the subset into the second block from the first block before erasing the first block. In this way the latest versions for all segments are always available in the main memory.

In an embodiment the mapping control circuit stores the versions of the mapping table parts for different ones of the segments in respective different blocks of the subset. In this embodiment the second block may be a spare block for all of the respective different blocks. In a further embodiment the mapping control circuit uses the first block after erasing as the spare block for replacing any one of the respective different blocks.

In an embodiment the mapping control circuit is configured to maintain a chain of pointers, stored in respective ones of the blocks, each non-final pointer pointing to a respective block that contains a next block in the chain, a final pointer in the chain pointing to a block from the subset. In this way dynamically changing subsets may be used. The chain may be part of a tree of pointers, with final nodes that point to different blocks in the subset. In another embodiment the pointing information itself may consist of such a chain or tree of pointers, or may comprise such a chain or tree.

In an embodiment each version of the pointer information comprises information identifying respective physical blocks that contain data and further information identifying further physical blocks that are free at the time of generation of the version. In this embodiment the mapping control circuit uses the further information to select physical blocks to replace the identified respective physical blocks that contain data. This makes it possible to search for replacement blocks by searching through the identified free blocks, even before a new version of the pointing information has been stored wherein the replacement has been accounted for. In this way less frequent versions of the pointing information suffice, which reduces wear.

BRIEF DESCRIPTION OF THE DRAWINGS

These and other objects and advantageous aspects will be apparent from a description of exemplary embodiments illustrated in the accompanying drawings.

DESCRIPTION OF THE EMBODIMENT

Figure 1:
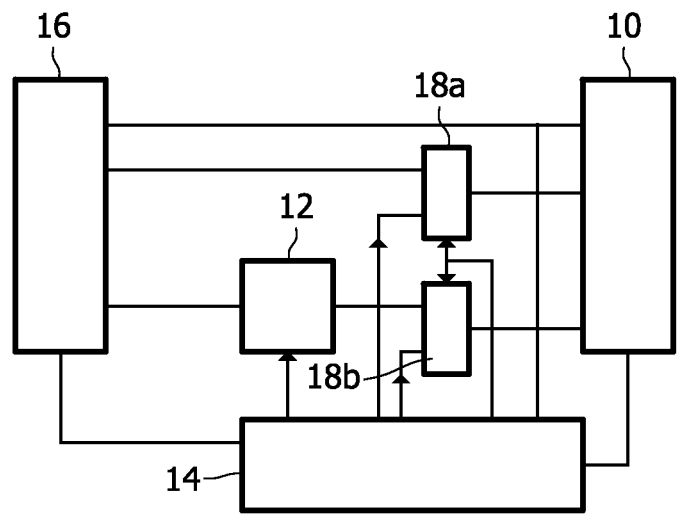
FIG. 1 shows an apparatus with a memory

FIG. 1 shows an apparatus with a memory. The apparatus comprises a flash memory 10, a mapping table memory 12, a mapping control circuit 14, a processor 16 and multiplexers 18a,b. By way of example mapping control circuit 14 is implemented as a programmable circuit programmed with a computer program that makes it execute the function of mapping control. Processor 16 has a control connection to mapping control circuit 14. Data input-outputs of processor 16 and mapping control circuit 14 are coupled to data input-outputs of flash memory 10. Mapping control circuit 14 and processor 16 have address outputs for a block address part (optionally also including a page address part) and a remaining address part. The block address part outputs and remaining address part outputs from processor 16 and mapping control circuit 14 are coupled to a block address input and a remaining address input of flash memory 10 via respective ones of multiplexers 18a,b. The address output from processor 16 is coupled to multiplexer 18b via mapping table memory 12. Mapping control circuit 14 has control outputs coupled to mapping table memory 12 and multiplexers 18a,b.

Flash memory 10 is of a type that allows erase operations of at least a block of memory locations at a time. Hence, the unit of erasing is a called a block. Memory locations can be programmed a page at a time. Typically, each block contains a plurality of pages.

In normal read operation processor 16 outputs read addresses to access memory locations. The addresses include a block address part and a remaining address part. The block address part of the read addresses is translated into a physical block address by mapping table memory 12 and supplied to flash memory 10. Translating typically involves using the logical block address as an address for mapping table memory 12 to retrieve the corresponding physical address. The remaining address part is supplied to flash memory 10 without translation. In a more advanced embodiment read address translation may involve translation of a combination of a page address part and the block address part of the address.

Figure 2:
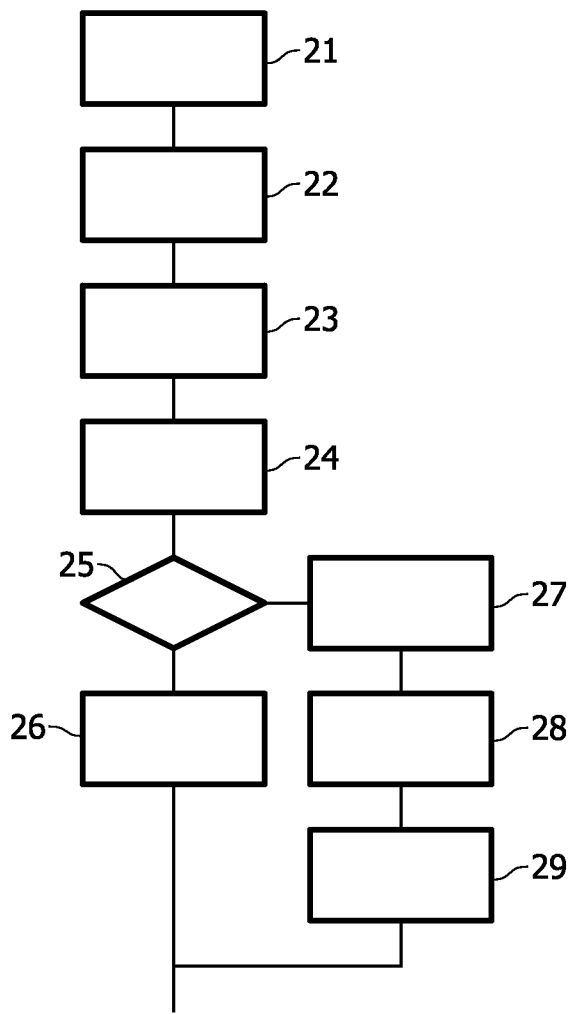
FIG. 2 shows a flow-chart of executing a write operation

FIG. 2 shows a flow-chart of a write operation. In a first step 21 processor 16 signals a request for a write operation to mapping control circuit 14, together with a logical block address that should apply to the write operation. In a second step 22 mapping control circuit 14 selects a physical block that will be used for writing. In the more advanced embodiment mapping control circuit 14 selects both a physical block and a physical page that will be used for writing. The selected block and page should be an erased block that is not used for another logical block address, or, in the advanced embodiment an erased page that is not in use. Optionally mapping control circuit 14 causes flash memory 10 to erase an unused block if that block has not already been erased. This is done in any case if none of the unused blocks has been erased.

Mapping control circuit 14 assigns the selected physical block (or page) to the logical block (or page) to which processor 16 requests to write. In a third step 23 mapping control circuit 14 constructs a new mapping table for mapping logical addresses to physical addresses, accounting for the newly assigned block (or page). In an embodiment mapping control circuit 14 updates the mapping table in mapping table memory 12 and causes flash memory to program the new data for the logical block (or page) in the memory locations of the physical block (or page).

In a fourth step 24 mapping control circuit 14 identifies an initial one of a set of blocks that is allocated for storing mapping tables that contains at least one programmed page.

Subsequently mapping control circuit 14 searches for a sequentially first unused page or set of pages in said initial one of the allocated blocks. In a fifth step 25 mapping control circuit 14 tests whether such a page or set of pages has been found. If so, mapping control circuit 14 executes a sixth step 26, programming the new mapping table in the page or pages that has or have been found. If mapping control circuit 14 finds no unused page in said initial one of the set of blocks, mapping control circuit 14 branches to a seventh step 27 wherein mapping control circuit 14 selects a next one of the set of blocks that is allocated for storing mapping tables. In an eight step 28 mapping control circuit 14 programs the new mapping table in a sequentially first unused page or set of pages in said next one of the set of allocated blocks. In a ninth step 29 mapping control circuit 14 controls flash memory 10 to erase the initial one of the set of allocated blocks.

Figure 3:
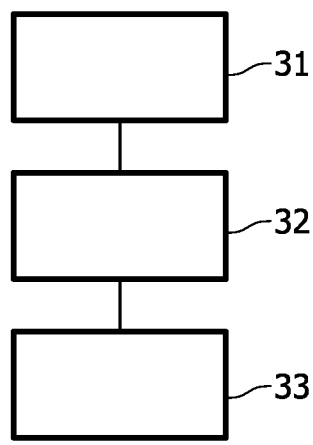
FIG. 3 shows a power-up flow-chart

FIG. 3 shows a power-up flow-chart for the apparatus. In a first step 31 mapping control circuit 14 identifies an initial one of a set of blocks that is allocated for storing mapping tables that that contains at least one programmed page. Subsequently mapping control circuit 14 searches for a sequentially last used page or set of pages in said initial one of the allocated blocks. In a second step 32, mapping control circuit 14 copies the mapping table from the last used page into mapping table memory 12. In a third step 33 mapping control circuit 14 starts normal operation of the system.

It should be noted that mapping control circuit 14 programs the new mapping table into flash memory 10 in eight step 28 before erasing the initial one of the blocks in ninth step 29. If this process is somehow interrupted, for example by removing power supply to (part of) the system, there is a risk that eight step 28 will be executed but not ninth step 29. Mapping control circuit 14 is arranged to detect this on power up, by detecting that one of the blocks allocated for storing mapping tables is full and at least one other one of these allocated blocks is not empty. If so, mapping control circuit 14 preferably uses the sequentially last used page or set of pages in that one of the allocated blocks that is not completely full on start-up and causes flash memory 10 to erase the allocated block that is full. Alternatively, mapping control circuit 14 may use the sequentially last used page or set of pages of the fully allocated block. In this case newly programmed data may be missed, but this may be the case anyway if the process of FIG. 2 was interrupted earlier.

Figure 4A:
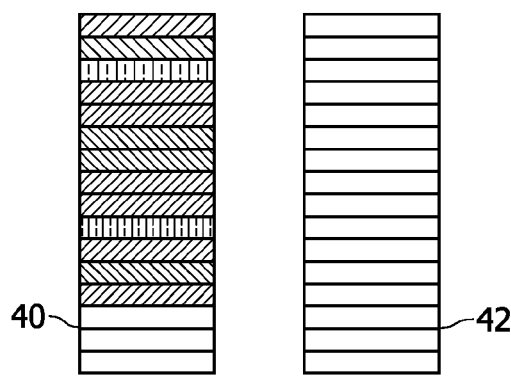
FIGS. 4a-d show blocks of memory with successive versions of pointers
Figure 4B:
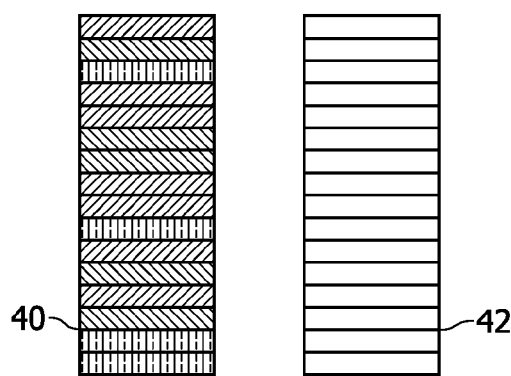
Figure 4C:
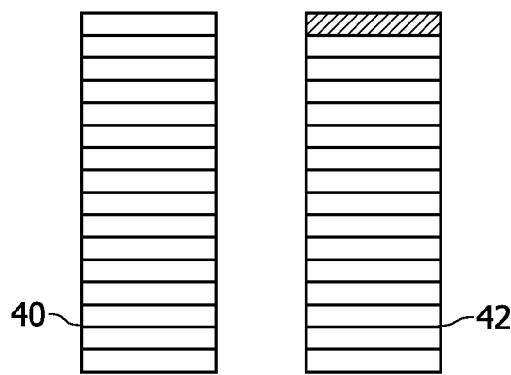

FIGS. 4*a-c* show three stages of use of pages in a set of blocks allocated for storing mapping tables. In each of the Figures the same set of two blocks 40, 42 is shown. Pages that have been programmed with mapping tables are shown by hatching. Erased (empty) blocks are shown by the lack of hatching. In an embodiment a flag bit in each page is programmed to indicate whether a page is empty or programmed. Alternatively an empty block may be detected by testing whether all data in the block is an erased state (e.g. logical bit value one), and optionally, if an ECC (error correcting code is used in the blocks) by testing whether the ECC indicates errors. Alternatively, if a tag is written along with the data, by testing for the presence of a valid tag present.

By way of example the pages are shown with increasing addresses lower down, so that the highest shown page has the lowest address.

In a first stage (FIG. 4*a*) part of the pages of a first block 40 have been programmed with mapping tables. When the blocks 40, 42 are in this state mapping control circuit 14 will use the lowest shown programmed page in the non-empty block 40 on power-up. When processor 16 requests to write, mapping control circuit 14 will select the highest shown empty page in the non-empty block 40 for programming the new mapping table.

In a second stage (FIG. 4*b*) all of the pages of first block 40 have been programmed with mapping tables, and the second block 42 is empty. In this case mapping control circuit 14 proceeds on power up as in the case of FIG. 4*a*. When processor 16 requests to write, mapping control circuit 14 will select first empty page in the second block 42 for programming the new mapping table. After programming the new mapping table mapping control circuit 14 erases the full block, which leads to the third stage shown in FIG. 4*c*.

In the third stage (FIG. 4*c*) the first block 40 is empty and part of the second block 42 has been programmed. When the blocks 40, 42 are in this state the role of the blocks is reversed with respect to FIG. 4*a*.

Figure 4D:
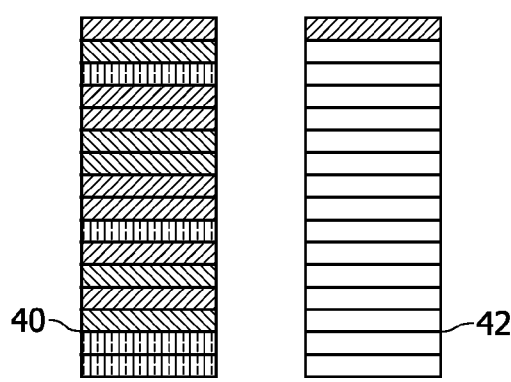

FIG. 4*d* shows a state that may arise after the second stage (FIG. 4*b*) due to premature disconnection of the power supply. One block 40 is full and the other block 42 is not empty. If mapping control circuit 14 encounters this state on power up, mapping control circuit 14 will erase the full block and use the mapping table from the block 42 that is not full.

In an alternative embodiment mapping control circuit 14 writes version numbers accompanying the mapping tables, the version number being increased each time when a table is written (or otherwise changed according to a predetermined sequence). In this embodiment the valid version of the mapping table can be identified by selecting the mapping table with the most advanced version number. In a further embodiment mapping control circuit 14 may write updates with version numbers to any of the intermediate blocks, erasing the other block after writing for example if that other block is full.

In another embodiment mapping control circuit may be arranged to set a "dirty" flag in the full block before writing to the new block to assist in selection of the right block on start-up. In this case, mapping control circuit 14 first tries to use the last mapping table from the block that is not marked as dirty. If this block is empty (due to an error) mapping control circuit 14 resorts to the dirty block.

The version numbers may change cyclically. The version numbers may be used in combination with position of the pages with mapping tables in the blocks, instead of testing for full and empty blocks for the purpose of finding the right block. In this case a short cycle of, say, four different version numbers suffices. Although embodiments have been shown wherein an integer number of mapping tables fits into a block, it should be appreciated that this is not necessary. When the size of the mapping table is such that a block cannot be filled with an integer number of mapping tables, mapping control circuit 14 may write the last mapping table overflowing from one block to the other. In this case mapping control circuit 14 uses the overflowing mapping table on start up if no further mapping table is stored behind the overflowing mapping table and mapping control circuit 14 does not erase the first block until after it has written a full mapping table in the next block.

Up to this point it has been assumed that mapping tables for a complete flash memory are stored. In a further embodiment, a plurality of mapping tables is provided for respective segments (ranges) of logical addresses.

In this further embodiment mapping control circuit 14 programs and loads mapping tables for the respective ranges from respective independently selectable pages in the set of blocks that is allocated for storing mapping tables. In one further embodiment mapping control circuit 14 is arranged to program an identification of the segment to which a mapping table applies into the page of flash memory 10 wherein that mapping table is stored. On power-up mapping control circuit 14 searches the allocated blocks to find the last sequential pages that contain identification for the respective segments. Preferably, mapping control circuit 14 copies these pages into mapping table memory 12 for use during translation of addresses.

When processor 16 requests to write a new page, mapping control circuit 14 generates a new mapping table as before, but only for the logical addresses in the segment that contains the logical address at which processor 16 requests to write. Accordingly mapping control circuit 14 only adds a new mapping table for that segment to the mapping tables in the set of blocks that is allocated for storing mapping tables. By way of example mapping tables for different segments have been indicated by different forms of hatching in FIG. 4a, b.

Figure 5:
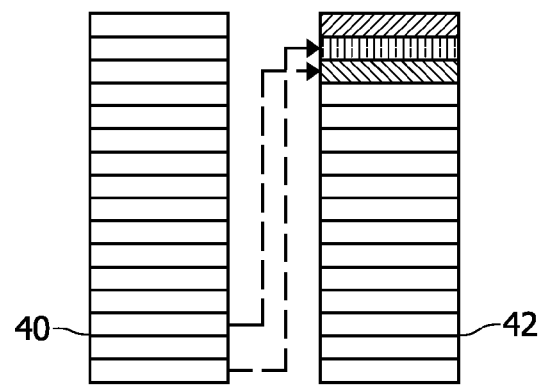
FIG. 5 shows blocks of memory with different mapping table segment pointers

FIG. 5 shows what happens during writing when an allocated block is full. In this case mapping control circuit 14 writes the new mapping table for the updated segment into an empty one 42 of the set of blocks that is allocated for storing mapping tables. In addition, in some embodiments mapping control circuit 14 copies the current mapping tables for the other segments into the empty one 42 of the blocks. This schematically shown by arrows in the Figure, although of course the content of these mapping tables may be copied from mapping table memory 12 instead of from flash memory 10. Subsequently mapping control circuit 14 causes flash memory 10 to erase the full block 40. This enables mapping control circuit 14 to identify which block contains the valid mapping tables on power up.

If the old block 40 has erroneously not been erased, mapping control circuit 14 detects that a full block 40 is combined with a non-empty block 42 and erases the full block on power up. Preferably mapping control circuit 14 first verifies that mapping tables for all segments are stored in the not-full block 42. If not, mapping control circuit 14 first searches for the sequentially last mapping tables for the uncopied segments in the full block 40 and copies these mapping tables to the not-full block 42 before erasing the full block 40.

As an alternative, the mapping tables for the other segments are not copied and the full block 40 is not erased when first a new mapping table is written into the empty block 42. In this case mapping control circuit 14 is still able to retrieve the blocks on power-up, much as in the case of erroneous disconnection. Erasing of the full block 40 can be postponed until the other block 42 becomes full, because on power up mapping control circuit 14 can still detect which of the blocks is the last written block by detecting which block is not full. In this alternative mapping control circuit 14 needs to erase the full block 40 only when the not-full block is about to become full. Preferably, in this case mapping control circuit 14 first copies the mapping tables for those segments for which no mapping table is yet stored in the not-full block 42, if any. That is, erasing may be postponed until the not-full block 42 has just enough space to leave a free page after those mapping tables are added that have not yet been programmed in the not-full block 42.

In another embodiment, the set of blocks that is allocated for storing mapping tables contains more than two blocks. This may be advantageous, for example if the data stored in the blocks (e.g. the mapping tables) are so large that they can overflow from one block to another. In this case, for example the allocated blocks may be used in a predetermined sequence. If so, preferably at least the least recently updated block of the set is erased first for reuse to store mapping tables. During start up, mapping control circuit 14 locates the empty block and uses it to determine the start/end of the sequence and from there mapping control circuit locates the most recent version of the stored data.

Figure 6:
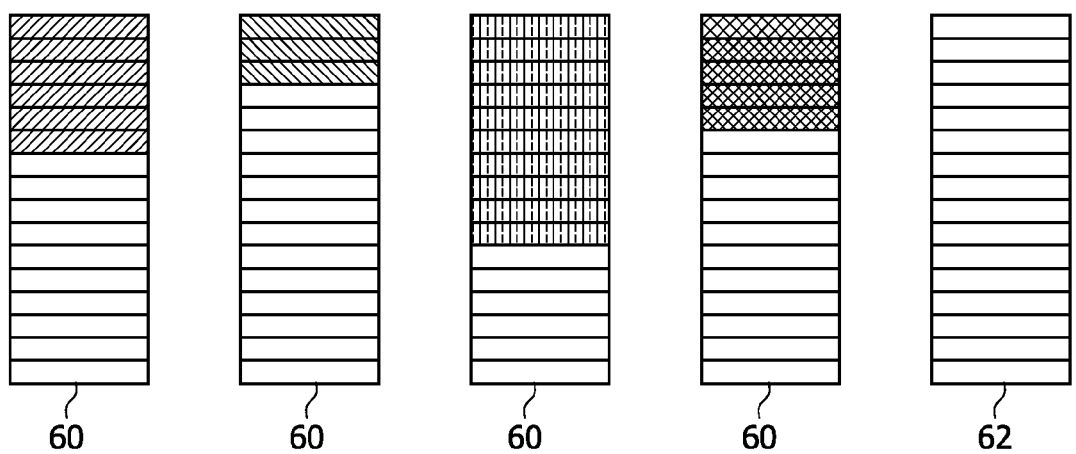
FIG. 6 shows blocks of memory with different mapping table segment pointers

FIG. 6 illustrates an embodiment wherein different blocks are used for different segments. In this case four blocks 60 are provided for as many segments and a spare block 62 is provided for the case that one of the blocks 60 becomes full. In operation, when mapping control circuit 14 handles a write request, mapping control circuit 14 programs the new mapping table for the segment that is changed by the write request into the block containing previous mapping tables for the segment. If the block 60 for that segment is full, mapping control circuit 14 programs the new mapping table into the spare block 62. The spare block then becomes the block for the segment and mapping control circuit 14 subsequently erases the old block for the segment. In one embodiment an identification of the segment is programmed into the new block, alternatively such an identification may be programmed in each page of the block when the page is written.

On power up mapping control circuit 14 tests each allocated block 60, 62 to determine for which segment the block is used. The sequentially last mapping table from the block is used as mapping table for the segment. If, due to a power interruption, there are two allocated blocks 60, 62 that contain data for a segment, mapping control circuit 14 selects from those the block that is not full, erases the other block and uses sequentially last mapping table from the block that is not full.

In one embodiment mapping table memory 12 contains tables for all segments in parallel, so that memory mapping table can translate any logical address immediately. In this embodiment mapping control circuit 14 loads mapping tables for all segments into mapping table memory 12. In an alternative embodiment, mapping table memory 12 stores mapping tables only for a limited subset of the segments, for example only for one segment at a time. In this embodiment mapping control circuit 14 replaces the mapping table for one segments by that for another, using a mapping table from the allocated blocks, 60, 62 or 40, 42 when a logical address is received in a segment for which the mapping table is not in mapping table memory 12.

Although embodiments have been shown wherein an integer number of mapping tables for segments fits into a block, it should be appreciated that this is not necessary. When the size of the mapping table for a segment is such that a block cannot be filled with an integer number of mapping tables for segments, mapping control circuit 14 may write the mapping table for the last segment overflowing from one block to the other in the case of FIG. 5. In this case mapping control circuit 14 uses the overflowing mapping table on start up if no further mapping table is stored behind the overflowing mapping table and mapping control circuit 14 does not erase the first block until after it has written a full mapping table in the next block. In the case of FIG. 6 the full mapping table for the segment is preferably written to the newly allocated block, thus immediately freeing the previously allocated block.

In one embodiment a predetermined set of blocks is allocated for storing mapping tables. In this embodiment the blocks of the predetermined set are located at predetermined addresses, so that mapping control circuit 14 can be designed to consult blocks at these predetermined addresses. However, this may have the disadvantage that the allocated blocks wear out more quickly. As an alternative, a changing block or blocks may be allocated to store the mapping table and a memory backed RAM may be provided storing a pointer to the allocated block or blocks.

Figure 7A:
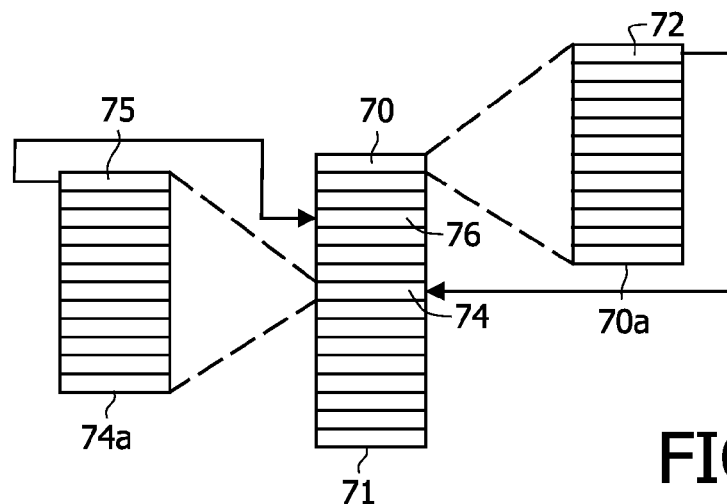
FIGS. 7a-c show blocks of memory with a chain of pointers

In an alternative embodiment a linked list structure is used to define the set of blocks that is allocated for storing mapping tables. This is illustrated in FIG. 7a. Herein the entire flash memory 71 is shown schematically, divided into blocks. A base block 70 at a predetermined physical address in flash memory (e.g. address zero) is used to store one or more base pointers. An enlargement 70*a* of this base block is shown, with a base pointer location 72. The base pointer from this location points to another block 74 that stores a further pointer. An enlargement 74*a* of this other block is shown, with a base pointer location 75 with a pointer that points a block 76 allocated for storing mapping tables.

During power up mapping control circuit 14 first loads a pointer 72 from base block 70, uses this pointer to address other block 74 from which mapping control circuit 14 loads a pointer to block 76 allocated for storing mapping tables. Mapping control circuit 14 saves this pointer for subsequent use, and uses the pointer to load a current mapping table from the block 76 allocated for storing mapping tables into mapping table memory 12. This may be done for example using any of the methods described in the preceding.

As can be noted each of the blocks 70 and 74 contain only one valid pointer. Hence these blocks are redundant in the sense that the block 76 with the mapping table could have been found just as well with a direct pointer in base block 70 or intermediate block 74. The redundant blocks are added to reduce the frequency with which the base block needs to be updated.

Furthermore this structure has the advantage that different physical blocks can be allocated as block 76 to store mapping tables, so as to avoid erasing the same blocks much more frequently than others. Each time the allocated block 76 is changed, a new pointer 75 is written into the block 74 that points to the allocated block 76. Preferably, at least the replaceable blocks (the allocated block 76 and the intermediate block 74) each store a counter value indicating the number of times it has been erased, so that mapping control circuit 14 can be configured to replace the relevant block by a different block when the counter value exceeds a threshold value. The counter value may be increased by one for example when it is written each time after the block has been erased.

Similarly, in the course of time different physical blocks can be used for the intermediate block 74, so as to avoid erasing the same block too often before storing a new pointer values. Each time the intermediate block 74 is changed, a new pointer 72 is written into the base block 70 that points to the intermediate block 74. It may be noted that the change of intermediate block 74 is less frequent than that of allocated block 76. In one example, a different physical block is chosen for allocated block 76 each time after erasing allocated block 76 N1 times (N1=8 for example). Hence intermediate block 74 needs to be updated only once for every N2 times in which allocated block is erased (N2=100000 for example, or more generally any integer number less than the maximum number of times a block can be erased and still be used for storing data). When a physical block that corresponds to intermediate block 74 has been erased N2 times, it in turn is replaced. Hence such a replacement occurs after N1*N2 times of erasing allocated blocks 76. Thus less rapid wear occurs for intermediate block 74 and even less wear occurs for base block 70.

Alternatively, no intermediate block 74 may be used, the pointer 72 in base block 70 pointing immediately to allocated block 76. This provides for more efficient use of the flash memory and faster retrieval of the mapping table. However, the wear of base block is increased. It should be noted that after some time the blocks with pointer values will have to be erased, which unavoidably leads to increased wear. To reduce such wear, the intermediate pointer in intermediate block 74 is used between base block 70 and the allocated block.

As another alternative a chain of a intermediate blocks may be used, the pointer 72 in base block 70 pointing to the first block in the chain and each next block pointing to the next block in the chain, except for the last block which points to the allocated block 76. In this way, wear of the base block can be reduced. The further the intermediate blocks are from the allocated blocks, the less these blocks will need to be updated. Thus base block 70, which has a predetermined physical address, can be insulated from such frequent updates that it wears out.

A chain of fixed predetermined length may be used. Alternatively a chain of dynamically adaptable length may be used. In this case the last intermediate block in the chain preferably stores an indication that its pointer points to an allocated block (or a block at a predetermined distance to the end of the chain indicates that a block at the predetermined distance along the chain stores such a pointer). In an embodiment mapping control circuit 14 increases the length of the chain when it detects an update frequency above a threshold (e.g. when a number of times that base block 70 has been erased exceeds a threshold value T). Thus, the chain length can be adapted to the type of use so as to avoid too much wear of base block 70. In one embodiment, the extension of the chain length is used to avoid updating base block 70 more than the threshold number of times. This may be realized for example by adding an additional intermediate block in the chain when base block 70 has been updated the threshold number of times (T=100000) for example, writing a pointer to the new block in base block 70, after erasing base block 70 for a last time, and writing a pointer to the next intermediate block in the new intermediate block. This can be repeated with the new intermediate block playing the part of the base block if the new intermediate block has been erased the threshold number of times T and so on. In further embodiments, the chain is part of a tree structure. That is, some blocks that store a pointer from the chain also store other valid pointers to other blocks, which in turn store one or more other pointers or (part of) a logical to physical address mapping table. On start up, mapping control circuit 14 traces pointers of all branches of the tree to find the (parts of the) mapping table.

A block that stores a plurality of valid pointers simultaneously corresponds to a node with divergence in the tree (a branch point). The final nodes in the tree (the leaf nodes) point to mapping table parts. A tree of any depth may be used. Preferably, at least some of the nodes in the three are not diverging nodes, but nodes that point to only one next node in the tree. These nodes serve merely to increase the depth of the tree (the number of nodes between the root and the leaves) and not to increase the number of leaf nodes. Thus, the update frequency of the block that stores the pointer or pointers for the root node can be reduced. Preferably, such a plurality of such non-diverging nodes is used in series. Also preferably an entire layer of nodes (all nodes at a given depth, at a same distance from the root node) is made non diverging, and more preferably the nodes of a plurality of successive layers are made non-diverging. These layers serve merely to increase the depth of the tree (the number of nodes between the root and the leaves) and not to increase the number of leaf nodes. Thus, the update frequency of the block that stores the pointer or pointers for the root node can be reduced. The depth of the tree may be increased dynamically to reduce the update frequency further when desired.

In a further embodiment a plurality of blocks is allocated for storing mapping tables or parts of mapping tables. This can be applied for example to the embodiment wherein a new mapping table is stored into a new allocated block before erasing the old mapping table in an old allocated block. Alternatively this may be applied for example to the embodiment wherein mapping tables for respective segments of logical block addresses are stored in respective blocks.

Figure 7B:
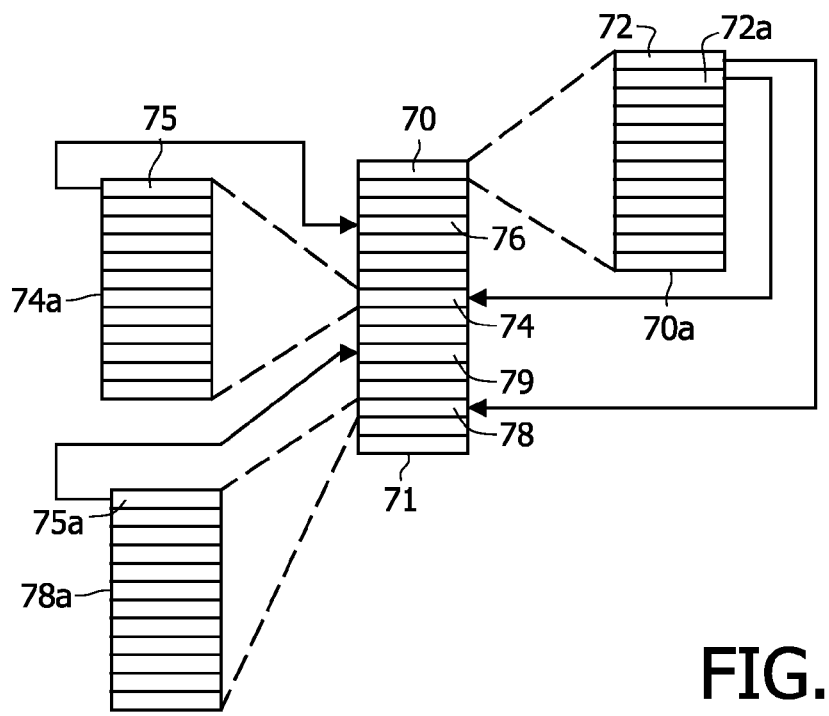

FIG. 7b illustrates this embodiment. In this embodiment base block 70 contains a first and second pointer 72a,b to respective intermediate blocks 74, 78, each of which in turn contains a pointer 75, 75a to a respective allocated block 76, 79. In this embodiment, during power up mapping control circuit 14 first loads pointers 72, 72a from base block 70, then uses these pointers to address other blocks 74, 78 and loads pointers to allocated blocks 76, 79 for storing mapping tables. Mapping control circuit 14 saves these pointers for subsequent use, and uses these pointers to load a current mapping table, or segments thereof from the block 76 allocated for storing mapping tables into mapping table memory 12. This may be done for example using any of the methods described in the preceding.

When another block starts to be used for storing mapping tables instead of one of the allocated blocks 76, 79 mapping control circuit 14 changes the pointer in intermediate block 74, 78, whichever pointed to the replaced allocated block 76, 79. Preferably, mapping control circuit 14 stores a new mapping table (or segment of a mapping table) the newly allocated block before changing the pointer.

Although a structure has been shown wherein two pointers 72, 72a are stored in base block, it should be appreciated that alternatives are possible. For example, instead of two pointers a single pointer to a single intermediate block may be stored, the intermediate block storing two pointers to allocated blocks 76, 79. This has the advantage that fewer blocks are needed, but it cause more wear because it requires more erase operations. As another example, more than two pointers may be stored (in base block 70 or intermediate blocks 74, 78) when more than two allocated blocks 76, 79 are used. As an alternative a single pointer may be used to one the intermediate block 74, 78 or to one allocated block 76, 79 when blocks in a predetermined physical relation to one another (e.g. with consecutive physical addresses) are be used for intermediate block 74, 78 or to allocated blocks 76, 79.

In the preceding examples, only valid pointers were shown stored in each block, which means that mapping control circuit 14 erases and rewrites base block 70 and intermediate blocks 74, 78 (or replaces intermediate blocks 74, 78) each time when the pointer value in these blocks is changed. Alternatively, mapping control circuit 14 may be configured to write each new pointer value to a new page in the base block 70, or intermediate blocks 74, 78 with pointers, without erasing previously stored pointers.

Figure 7C:
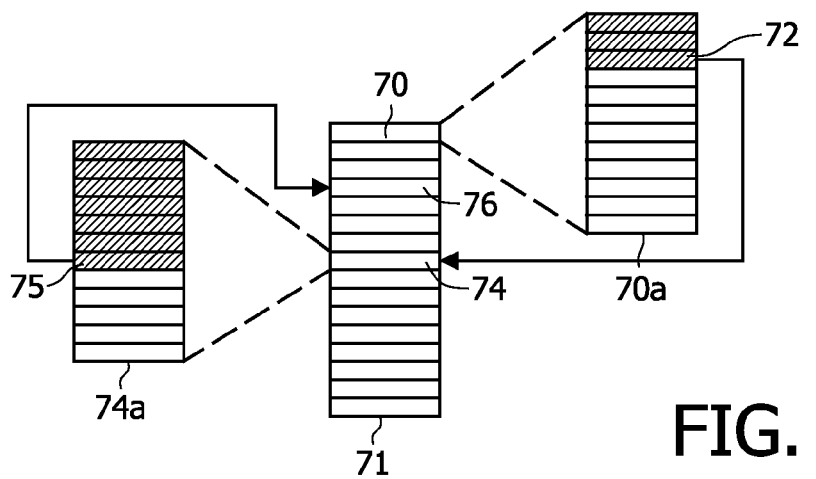

FIG. 7c illustrates the use of successive pages for successive pointers 72, 75. Pages containing pointer values are indicated by hatching. In each case the lowest hatched page (the page with the highest address containing a pointer value) contains the valid pointer value. The higher pages (with lower addresses) contain older (invalid) pointer values. In an alternative embodiment mapping control circuit 14 writes version numbers accompanying the pointers, the version number being increased each time when a table is written (or otherwise changed according to a predetermined sequence). In this embodiment the valid version of the mapping table can be identified by selecting the mapping table with the most advanced version number.

During start up mapping control circuit 14 distinguishes the valid (most recently stored) pointer values from invalid pointer values for example by searching for a page with a pointer that is followed by an empty page in some predetermined sequence of pages. The predetermined sequence may be the sequence of physical addresses for example. The search may be a binary search for example (first testing whether a page midway the block is empty, then testing a page midway the first or second half of the pages if the first tested page was empty or not respectively, and so on until the tested pages has already tested neighbors on both sides. This embodiment has the advantage that less frequent erase operations are needed, at the expense of longer search time during start-up.

In an alternative embodiment mapping control circuit 14 writes version numbers accompanying the pointers, the version number being increased each time when a new pointer is written (or otherwise changed according to a predetermined sequence). In this embodiment the valid version of the pointer can be identified by selecting the pointer with the most advanced version number. In a further another embodiment mapping control circuit 14 may write updates with version numbers to any of the intermediate blocks, erasing the other block after writing for example if that other block is full.

The version numbers may change cyclically. The version numbers may be used in combination with position of the pages with pointers in the blocks, instead of testing for full and empty blocks for the purpose of finding the right block. In this case a short cycle of, say, four different version numbers suffices.

In another embodiment mapping control circuit may be arranged to set a "dirty" flag in the full intermediate block before writing to the new intermediate block to assist in selection of the right block on start-up. In this case, mapping control circuit first tries to use the intermediate block that is not marked as dirty. If this block is empty (due to an error) mapping control circuit 14 resorts to the dirty block.

In the embodiment wherein a plurality of valid pointer values is used in parallel (as in the case of FIG. 7b) the pointer values may be stored accompanied by an identification of their rank in the plurality of parallel pointer values. In this case, during start up, mapping control circuit 14 searches for the valid (most recently stored) pointer values for each rank that have most been at more advanced positions in the predetermined sequence than any other pointer values for the same rank.

Figure 8A:
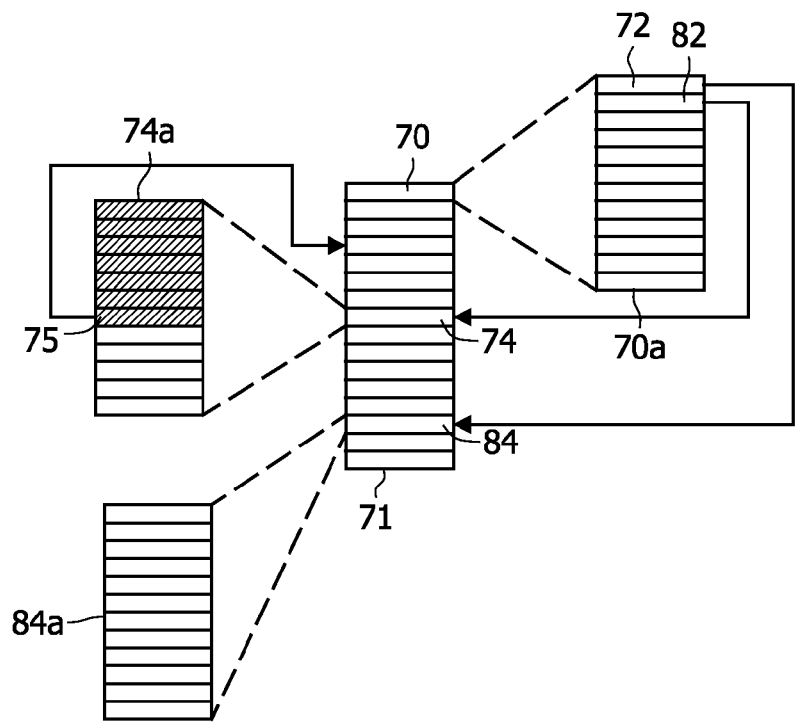
FIGS. 8a-c show blocks of memory with a tree of pointers
Figure 8B:
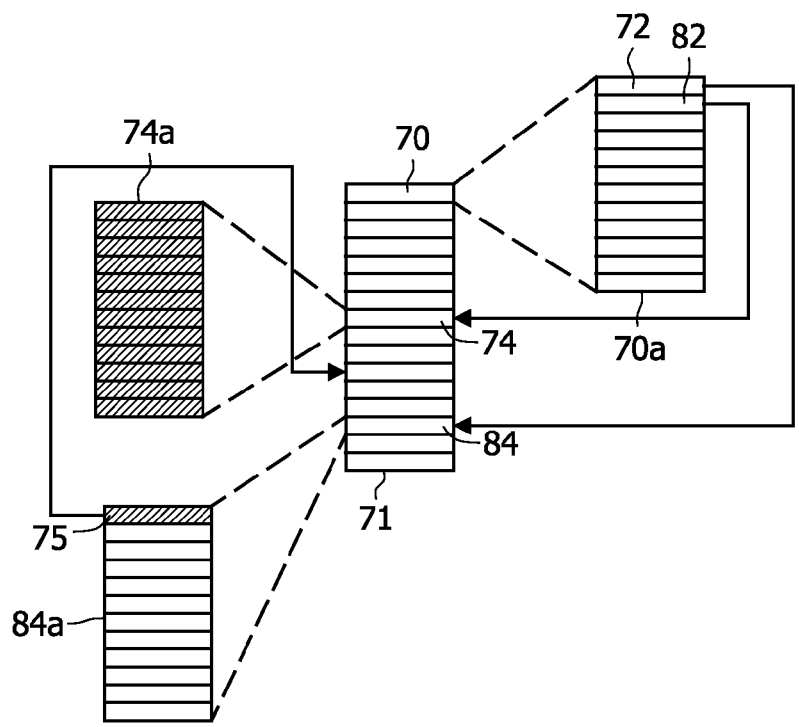
Figure 8C:
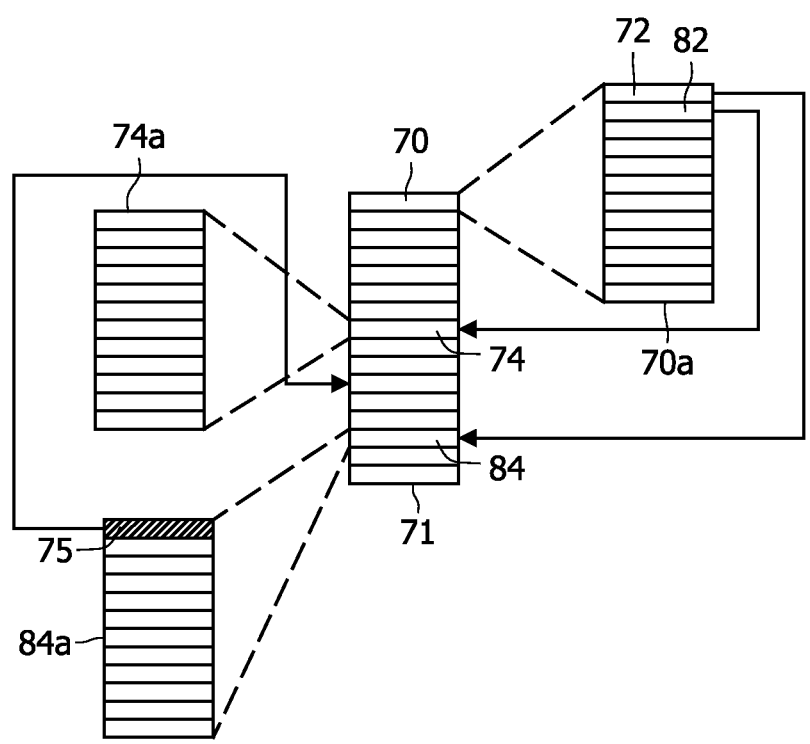

When mapping control circuit 14 has used all pages for storing pointer values and a new pointer value must be written, mapping control circuit 14 erases the block and starts again from the top. FIGS. 8a-c illustrates an alternative embodiment wherein a plurality of blocks is used for pointer values. Pointers 72, 82 in base block 70 refer to a first intermediate block 74 and a second intermediate block 84. Initially, as shown in FIG. 8a, each time a pointer value is changed the changed pointer value 75 is written to a new page in first intermediate block 74 and second intermediate blocks 84 remains empty. When first intermediate block 74 is full, mapping control circuit 14 writes the next changed pointer value 75 to a first page of a second intermediate block 84, as shown in FIG. 8b and subsequently erases the old block of pointer values as shown in FIG. 8c.

In this way errors due to interruption of the update can easily be recovered. During start-up mapping control circuit 14 tests whether first intermediate block 74 is full and if so tests whether one or more pointers are available from second intermediate block 84. If so, mapping control circuit 14 uses the last pointer from second intermediate block 84, if not mapping control circuit 14 uses the last pointer value from first intermediate block 74. If first intermediate block 74 is empty, mapping control circuit 14 uses the last pointer value from second intermediate block 84.

It may be noted that addition of the pointer value to the second intermediate block 84 and erasing of the old second intermediate block may be spread over time (erasing being delayed for example until a plurality of pointer values has been written into second intermediate block 84), since mapping control circuit 14 can be configured to determine, at start-up, which intermediate block contains the valid pointer value, by testing whether the intermediate block is full, using the last pointer value from the other intermediate block if that block is not empty and using the last pointer value from the preceding intermediate block otherwise.

This technique may also be applied to base block 70. When all pages of base block 70 are used for example, mapping control circuit 14 writes a next pointer values to a first page in a predetermined auxiliary base block (the block with block address 1 for example) and subsequently erases base block 70. In the case of a change of second intermediate block 84 for example, mapping control circuit 14 adds a pointer value to the second intermediate block 84 (if necessary) after the pointer value 82 to the old intermediate block, writes a pointer value to a first page in the second intermediate block 84.

Figure 9A:
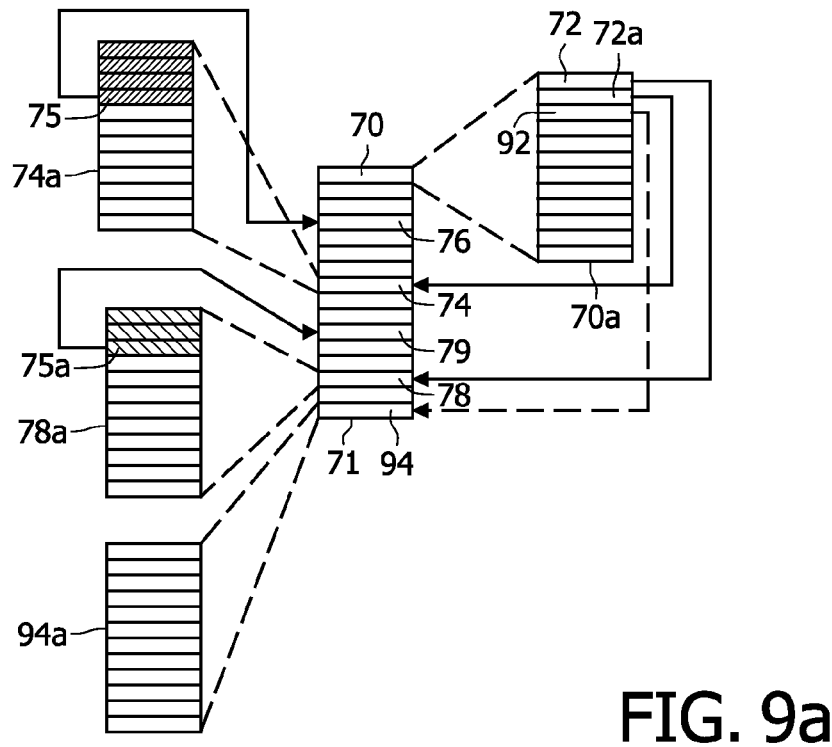
FIGS. 9a-b show blocks of memory with a chain of pointers

FIG. 9a illustrates an example wherein more than one valid pointer value is used in parallel, as in the case of FIG. 7b for example. The parallel pointer values correspond to respective ranks (corresponding for example to the ranks of successive segments of the mapping table for successive logical address ranges: the parallel pointers are labelled first and second pointer). Respective intermediate blocks are assigned to storage of pointer values for respective ranks, information identifying the assigned rank (e.g. a number corresponding to the rank) is stored in each intermediate block that contains pointer values.

Figure 9B:
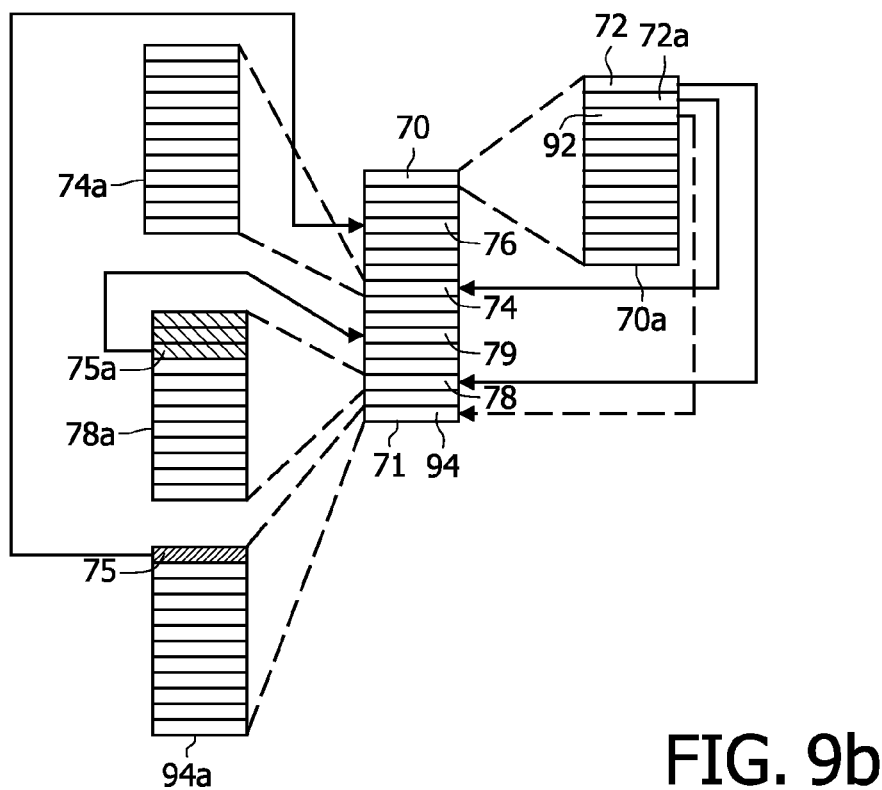

The valid parallel pointers are each stored in the last occupied location of the respective intermediate blocks 74, 78. An additional pointer 92 is stored in base block 70, which points to an additional intermediate block 94. This additional intermediate block 94 remains empty while none of the other intermediate blocks 74, 78 are full. In this case mapping control circuit 14 writes new pointer values to successive pages in intermediate blocks 74, 78. When one of intermediate blocks 74, 78 is full and a new pointer value must be added, mapping control circuit 14 writes the new pointer value to additional intermediate block 94. In addition mapping control circuit 14 writes an identification of the rank of the pointer to additional block 94. As shown in FIG. 9b subsequently mapping control circuit 14 erases the filled intermediate block. This erased block now assumes the part of the additional intermediated block: when an intermediate block is again full when a pointer value must be added, mapping control circuit 14 writes the pointer value to the now empty block and erases the filled block.

On start-up mapping control circuit 14 loads the pointers from base block 70 and determines which pointer points to an intermediate block for each rank. If two of such intermediate blocks correspond to the same rank then mapping control circuit 14 selects one of those intermediate blocks, which is not full or empty for loading the pointer to the allocated block and erases the other intermediate block if it is full. If one block for the rank is full and the other is empty mapping control circuit 14 uses the last written pointer value from the full block.

Figure 10A:
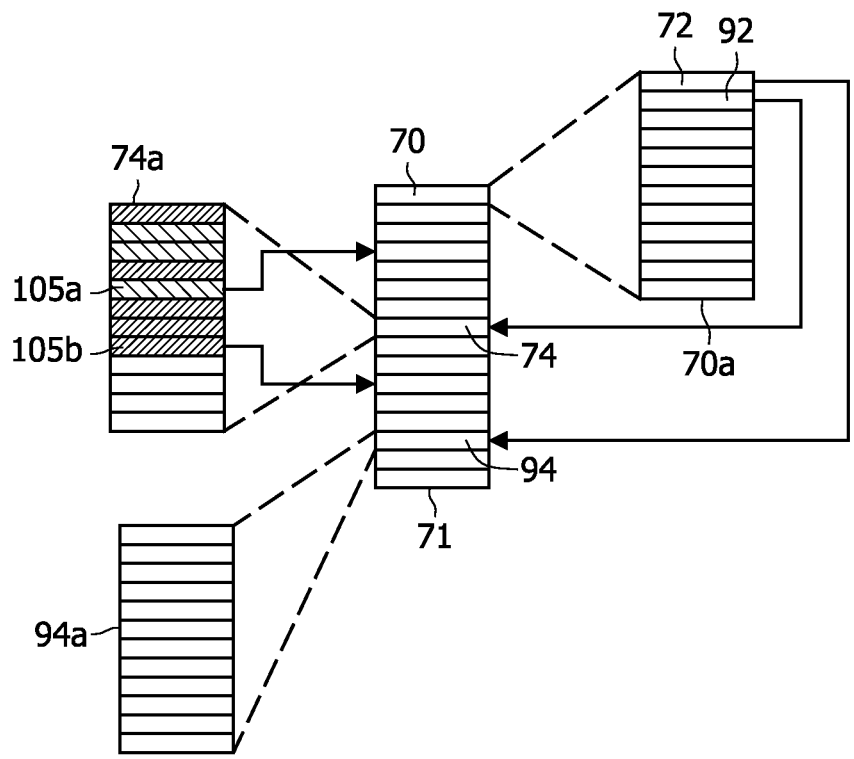
FIGS. 10a-b show blocks of memory with a chain of pointers
Figure 10B:
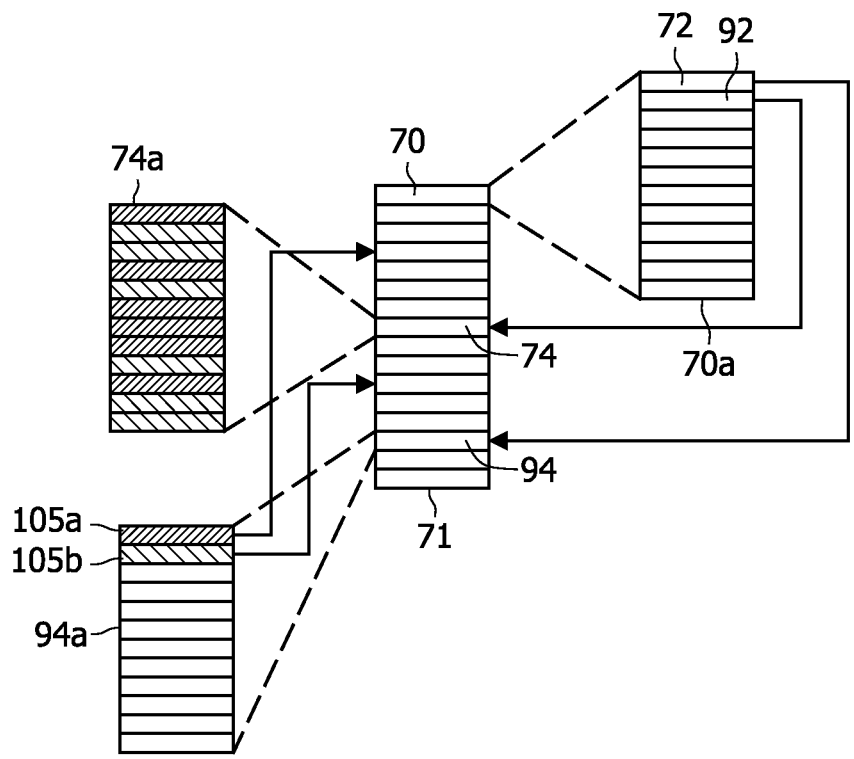

FIG. 10a,b show embodiments wherein pointer values 105a, 105b of different rank are stored together in the same block, each accompanied by an identification of its rank. In this embodiment mapping control circuit 14 adds new pointer values for all ranks to the same intermediate block 74 until that block is full. When next a new pointer value for a rank must be written, mapping control circuit 14 writes the new pointer value for that rank to the additional block 94 and copies the valid pointer value or pointer values for the other rank or ranks to the additional block 94. Subsequently, mapping control circuit 14 erases the filled block. On start-up mapping control circuit 14 uses the pointer values in base block 70 to determine the intermediate blocks and searches for a non-empty and not-full intermediate block and uses the last written pointer values from that block if this does not result in pointer values for all ranks, mapping control circuit 14 loads the last written pointer values for all remaining ranks from the other block if this is full.

It should be appreciated that in any of the embodiments wherein a valid pointer value has to be selected from more than one possible block mapping control circuit 14 may be configured to use any mechanism, such as elimination of a full blocks if a non empty other block is available, use of version numbers, use of a dirty flag etc. to determine the block to be used. Also if an inconsistency occurs mapping control circuit 14 may identify a last reliable version. For example if mapping control circuit determines that a pointer refers to an invalid mapping table (an empty mapping table or a table that maps different logical addresses to same physical address for example) mapping control circuit may resort to an earlier version of a pointer. This leads to best possible error corrections when it is ensured that mapping control circuit 14 does not erase information before completing replacement for the information.

In a further embodiment the number of updates is reduced. This is done by storing, in association with the mapping table, a list of "free" blocks that specifies blocks that should be entered in the mapping table when the mapping table is updated. Thus, if a logical address maps to a physical address of a first block and during a subsequent update of the data in the first block mapping control circuit 14 selects to replace that first block by a second block (for example to avoid more wear of the first block), mapping control circuit 14 selects the second block from the free list and stores an identification of the logical address (e.g. a "tag") in the second block. In this case mapping control circuit 14 omits to write a new mapping table. Instead, on subsequent start-up mapping control circuit 14 uses the free list stored in association with the old mapping table to determine whether any of the blocks on the free list have been used for updates. If so, mapping control circuit 14 infers corrections of the mapping table from the identifications of logical addresses in these blocks. A new version of the mapping table needs to be stored only when all blocks on the list of free blocks have been used.

Figure 11:
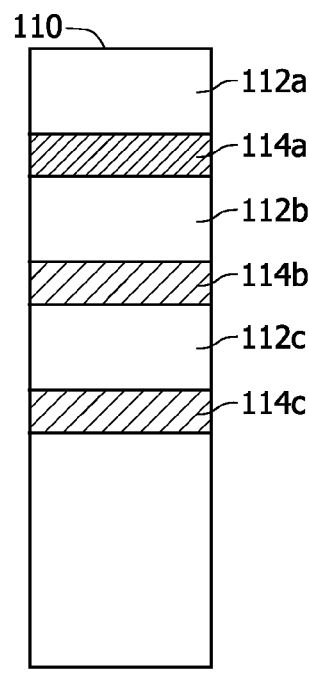
FIG. 11 shows use of a free list

FIG. 11 illustrates a block 110 from the memory with mapping table information for use in this embodiment. The block contains successive versions 112a-c of the mapping table, each accompanied by a "free list" 114a-c with addresses of free blocks. The last version of the mapping table 112c and its accompanying free list 114c is termed the current version. In operation, when a physical block, whose address appears in the current version of the mapping table 112c has to be updated using a replacement block, mapping control circuit 14 uses a first available address from the associated free list 114c and writes the update to the block addressed by the first available address. In addition mapping control circuit 14 writes a tag to this new block, which identifies the logical block address to which the update applies. Mapping control circuit 14 erases the old block that still appears in the current mapping table 112c, after the update in the new block has been completed.

Preferably, mapping control circuit 14 updates the mapping table in mapping table memory 12 accordingly. When mapping control circuit 14 detects that all blocks in the current free list 114c have been used for updates, mapping control circuit 14 writes a new version of the mapping table and a list of the old blocks that have been erased into block 110 behind the old free list 114c (or into another block that is used for mapping table data). Preferably, each free list contains addresses of a plurality of blocks. In this case the new version of the mapping table and the free list is preferably written only once the old free list 114c has been exhausted.

On start-up mapping control circuit 14 retrieves the current version of the free list 114c, for example by searching for the last non empty pages in block 110. Mapping control circuit 14 then consults pages addressed by the addresses on this free list 114c and determines whether data has been written to these pages. If so mapping control circuit 14 determines from the tags which corrections must be applied to the current version of the mapping table. Thus, one or more corrections are determined that each identify an address of a logical block and an address of a physical block with updated data for that logical block. In one embodiment mapping control circuit 14 copies the current version of the mapping table 112c from block 110 into mapping table memory 12 and applies the corrections to the mapping table in mapping table memory 12. In another embodiment mapping control circuit 14 stores a list of corrections in mapping table memory 12 and applies these to entries of the mapping table when they are loaded from block 110.

Preferably, mapping control circuit 14 uses blocks from the free list 114c for updates in the sequence in which the addresses of these blocks appear in the free list 114c. In this case, on start-up mapping control circuit 14 preferably tests the blocks on the free list 114c for updates in the sequence in which the addresses of these blocks appear on the free list and stops testing once it has been determined that a block has not been updated. This speeds up start-up, but even without using such a sequence start-up is quite fast, when only a fraction of the blocks appears on the free list 114c.

Preferably each old block that appears in the current mapping table 112c is erased once an updated version of the block has been completely written. Thus no data is lost. However, erasing may be delayed until just before the new version of the mapping table and the free list (in which all erased block preferably appear) is written. Also, although an embodiment has been shown wherein mapping tables 112a-c and free lists 114a-c are stored one after the other, it should be appreciated that the association between mapping tables and free lists can be realized in other ways, for example by including version numbers with both, in which the mapping table and free list can be stored arbitrarily. Also the mapping table and associated free list can be stored in different blocks, for example in the same sequence to provide the association.

It should be appreciated that this technique can be applied in combination with all of the preceding embodiments, or on its own. For example, a plurality of blocks may be used to store versions of the free list and associated mapping table, a full block being erased only after writing a new version to a new block, so that the latest versions can be found on start-up by searching.

As another example, a segmented mapping table may be used, in which case new versions for updated segments need to be stored. In this case respective free lists can be used for the respective segments, updates of blocks for a segment being performed using the free list for the segment. But preferably a common free list for all segments is used, updates of blocks for any segment being performed using the same shared free list for all segments. This reduces the number of updates of the mapping tables that need to be stored. It should be noted that in this case preferably no restraints are imposed on addresses of blocks that are referred to in respective segments, which may mean that slightly longer addresses are needed in the mapping table for a segment than when each segment maps to a respective set of physical blocks that all have the same address value for certain address bits.

Furthermore, when segments are used, in an embodiment mapping table memory 12 caches a mapping table part for only part of the segments (e.g. for only one segment). This makes it possible to use a small mapping table memory 12. In this case, corrections for all segments are preferably stored in mapping table memory 12, along with the cached mapping table. In this case mapping control circuit 14 loads a mapping table for a new segment into mapping table memory from a block of flash memory when needed and applies the corrections stored in mapping table memory 12. In a further embodiment mapping control circuit 14 may be configured to try to map a logical address using the correction before loading the mapping table for a segment from flash memory 10. This increases access speed.

As a further example a chain of pointers may be used to identify the block 110 (or a set of blocks) wherein mapping tables and free lists are stored. In this way block 110 (or a set of block for storing mapping tables and free list together or separately) can be exchanged without problems of wear.

The use of a free list may also be applied to the chain of pointers. In an embodiment the pointers to intermediate blocks in the chain are associated with a free list of that point to blocks that will be used for new intermediate blocks. When a new intermediate block is created, a block identified on the free list is used and new pointer values are written to this block. In addition some information is stored in this block as the valid block (e.g. by including a version number) and the pointers in the base block to that intermediate block are not updated. Only if the free list is exhausted the base block is updated, with pointer values to the new intermediate block and a free list.

Although embodiments have been shown wherein an integer number of mapping tables plus free lists fits into a block, it should be appreciated that this is not necessary. When the size of the mapping table plus free list is such that a block cannot be filled with an integer number of mapping tables plus free lists, mapping control circuit 14 may write the last mapping table plus free list overflowing from one block to the other. In this case mapping control circuit 14 uses the overflowing mapping table plus free list on start up if no further mapping table plus free list is stored behind the overflowing mapping table and mapping control circuit 14 does not erase the first block until after it has written a full mapping table plus free list in the next block.

Figure 12A:
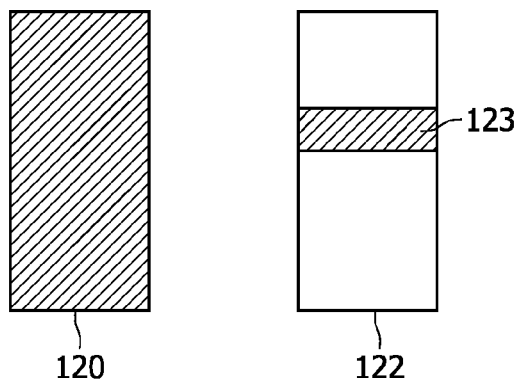
FIG. 12a-b show use of a free list

FIG. 12a illustrates an example wherein blocks are not immediately updated completely. A first block 120 is shown that stores an original complete set of data for a logical block. A second block 122 is shown that stores updated data 123 for the logical block.

In an embodiment, mapping control circuit 14 is configured to respond to a command to update a part of a logical block that maps to first block 120 by selecting an empty block, for example from free list 114c. This empty block becomes second block 122. Mapping control circuit 14 writes only the updated part of data 123 of the block to second block 122. When mapping control circuit 14 receives a subsequent command of this type, for locations in the same logical block, which locations that do not overlap with the earlier updated locations, mapping control circuit 14 writes the new updated data to second block 122. Mapping control circuit 14 repeats this for other subsequent commands.

If the updates in the subsequent command do overlap, mapping control circuit 14 copies the remaining (not yet updated) locations of first block 120 to second block 122. Mapping control circuit 14 also writes information to second block 122 which indicates that second block 122 has been completed. After that second block takes over the part of first block 120 and mapping control circuit 14 selects a new block (e.g. from free list 114*c*) to act as second block for storing updates. The original first block 120 is subsequently erased.

At any time, for example when no more free blocks are available, mapping control circuit 14 may copy the remaining (not yet updated) locations of first block 120 to second block 122. Mapping control circuit 14 then also writes information to second block 122 which indicates that second block 122 has been completed. After that mapping control circuit uses second block 122 in the role of first block 120 and the original first block 120 is subsequently erased. In an embodiment, mapping control circuit 14 when the device is powered down also performs this operation.

During reading, if mapping control circuit 14 receives a read command for the logical block, mapping control circuit 14 determines whether a first and second block 120, 122 are available for the logic block and if so determined whether the read operation concerns the updated data 123 from second block 122 for updated locations or original data from first block 120 for not-updated values. In the former case, mapping control circuit 14 directs the read operation to second block 122 and in the latter case mapping control circuit directs the read operation to first block.

Mapping control circuit 14 preferably stores further corrections in mapping table memory 12, indicating the part (or parts) of the block that has been updated, for use to identify the updated data 123 during read operations. These further corrections are stored in mapping table memory 12 for example when the updates have been written.

In an embodiment mapping control circuit 14, on start-up, recovers the updates using free list 114*c*. In this embodiment mapping control circuit 14 performs tests on one or more blocks that are listed on free list 114*c* whether these blocks contain data and a tag indicating for which logical block. If so, mapping control circuit 14 performs tests whether these blocks contain information which indicates that the block has been completed. If so, mapping control circuit 14 uses the block instead of the block identified for the logical block in mapping table 112*c*. If mapping control circuit 14 finds a block that contains data but is not complete, mapping control circuit 14 uses this block as a second block 122 and the block listed for the same logical block in mapping table 122*c* as first block. In an embodiment mapping control circuit 14 generates a further correction in this case and stores this further correction in mapping table memory.

Figure 12B:
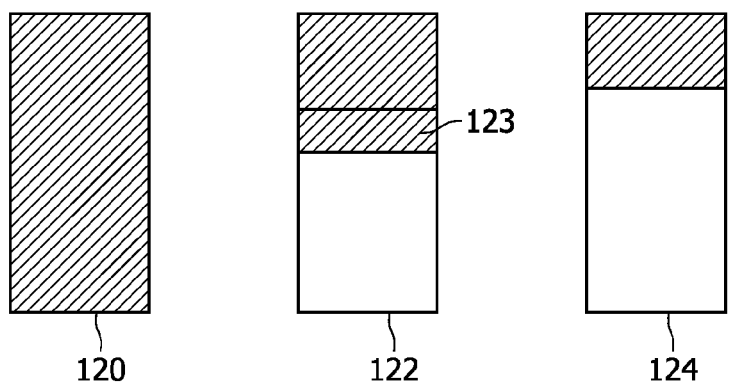

FIG. 12*b* illustrates an embodiment wherein in addition to the updated data 123 also copied data is stored for addresses that precede the updated data 123. This simplifies the further correction for reading: data up to the end of the updated data 123 can be read from second block 122 and the data following the updated data 123 needs to read from first block 120. This is particularly useful for flash memories 10 wherein blocks can only be written in sequence. In this case, during a write operation mapping control circuit 14 first copies data up to the updated data from first block 120 to second block 122 and then writes the updated data 123 to second block 122.

In a further embodiment mapping control circuit 14 tests further write commands to determine whether the write command is to a logic address for which a first block 120 and second block 122 are in use. If so, mapping control circuit 14 tests whether the write command is directed at locations in the block behind the updated data. If so mapping control circuit 14 copies data from first block 120 to second block 122 from the end of the updated data 123 to the start of the addresses of the further write command and subsequently writes the data of the further write command in the second block 122. If the locations for the new write command precede or overlap with the part of second block that has been written, mapping control circuit 14 selects a free block as a third block 124 and writes the data for the new write command into that third block 124, preceded by a copy of data from second block 122.

In one embodiment mapping control circuit 14 maintains first, second and third block 120, 122, 124 in use. When a further write operation occurs to the same logical block, even more blocks may be used. In this embodiment mapping control circuit 14 fulfils read operations form one of these blocks 120, 122, 124, dependent on the read address. Accordingly, mapping control circuit 14 may store a further correction that identifies each of these blocks 120, 122, 124 and the positions in the blocks up to where the latest data is stored. Also at any time (for example when no more free blocks are available) memory mapping control circuit 14 may sweep up all the corrections to fill up the least filled block 124 (taking the next part of the before latest block 122 and so on), and store information in this third block 124 that it has been completed. Mapping control circuit 14 can subsequently erase the other blocks 120, 122 and write an updated memory mapping table and free list to flash memory 10.

At start up, mapping control circuit 14 searches blocks listed on free list 123*c* to determine whether they contain data. If a block for a logical block contains an indication that it is complete, mapping control circuit 14 uses that block instead of the block listed in the mapping table for that logical block. If mapping control circuit 14 finds that one or more blocks from the free list contain data for the same logical block, but that none of these blocks indicates that it is complete, mapping control circuit 14 constructs further correction information which refers to the blocks 122, 124 that it has found.

In principle, when mapping control circuit 14 receives a write command when more than one additional block 122, 124 is in use for a logical block, and the write updates the data at a location behind the last updated location in each additional block 122, 124, mapping control circuit 14 has a choice of where to write the update. Writing in the oldest (most filled) additional block has the advantage that more room is left for updates in the younger block, which reduces the need for additional blocks. However, writing in the youngest additional block may also be used, which has the effect that the updated data in the youngest block may extend beyond that in older blocks. In this case mapping control circuit 14 preferably erases the older blocks. Preferably also mapping control circuit 14 writes information in the blocks to indicate the sequence of updating in this case, for use during start up for forming the further correction.

As used herein both the pointers in the chains and the addresses of physical blocks in mapping tables as well as block addresses in the free lists will be termed pointing information for use to identify respective ones of the physical blocks that are assigned to respective functions. Typical example of the functions are blocks that function as block for a logical block address, blocks that provide pointers and blocks that provide free lists.

Mapping control circuit 14 may be implemented for example as a programmable processing circuit, programmed with a program of instructions for using the blocks as described herein. Alternatively part or all of mapping control circuit 14 may be implemented as a circuit dedicated to perform the described functions.

Although embodiments have been shown wherein pointing information pointing to individual blocks is used and individual blocks are used to store pointing information (blocks being the unit of erasing), it should be appreciated that instead pointing information that points to groups of such units of erasing may be used and/or groups of units may be used to store successively valid pointer values.

Although an embodiment has been shown wherein the list of (further) corrections is stored in mapping table memory 12, which is preferably a RAM memory such as an SRAM or DRAM, it should be understood that alternatively an additional RAN memory (not shown) may be provided, coupled to update control circuit 14, to store the list of corrections. Similarly, other information, such as final pointers obtained by following chains of pointers, identifications of non-empty blocks for use in writing subsequent updates etc may be stored in mapping table memory 12 or such an additional RAM memory, so that searching through flash memory 10 for this information need only be performed on start up, and optionally at some exceptional time points later on, e.g. after reception of a reset signal or an error signal.

As will be appreciated some physical blocks may become unusable in the course of time, for example due to wear after such a blocks has been erased more than a certain number of times, or due to other errors that arise in a block. When this occurs mapping control circuit 14 avoids using these blocks. Once a block has been abandoned it is removed from the mapping table and the free list. Optionally mapping control circuit 14 maintains information that represents a "bad list" of physical block addresses that mapping control circuit 14 should no longer use in flash memory 10. When a block is abandoned it is added to the "bad list", but no immediate update of the free list or the mapping table in flash memory 10 is needed. The latter update may be postponed until the free list has been exhausted. On start-up mapping control circuit 14 tests the bad list whether a block referred to in the free list or mapping table is also on the bad list, and if so mapping control circuit 14 acts as if the block is not on any of these lists.

The invention claimed is:

1. A memory apparatus, the apparatus comprising:
   a non-volatile main memory circuit that comprises a plurality of physical blocks of memory locations, the main memory supporting erasing of at least a physical block at a time; and
   a mapping control circuit configured and arranged to maintain pointing information for use to identify respective ones of the physical blocks that are assigned to respective functions, to define a subset of the physical blocks and to store successive versions of the pointing information in a first and second one of the physical blocks from the subset, the mapping control circuit being configured and arranged to
   erase the first one of the blocks, after storing a first version of the pointing information in a second one of the blocks, the first version being not less recent than any of the pointing information in the first one of the blocks, and
   recover the pointing information at least on start up of the main memory by testing which physical block of the defined subset contains a most recent version of the pointing information by searching in the subset for a partly filled block that has only partly been written, and
   in response to finding a partly filled block, using a last written version of the pointing information from that partly filled block, and
   in response to finding no partly filled block, using a last written version of the pointing information from a full block.

2. A memory apparatus according to claim 1, wherein the mapping control circuit is configured to, for other pointing information not in the partly filled block, using a last written version of the other pointing information from a full block.

3. A memory apparatus according to claim 1, wherein the mapping control circuit is configured to write version numbers accompanying the versions of the pointing information, said testing being performed by searching for a version of the pointing information with a most recent version number.

4. A memory apparatus according to claim 1, wherein the mapping control circuit is configured to allow writing one of the versions of the pointing information overflowing from the first one of the blocks into the second one of the blocks and to erase the first one of the blocks only after writing a full mapping table in the second one of the blocks.

5. A memory apparatus according to claim 1, wherein the mapping control circuit is configured to maintain a mapping table that maps logical addresses to respective ones of the physical blocks or groups of physical blocks, the pointing information comprising the mapping table, the mapping control circuit being configured to store versions of mapping table parts for respective segments of a logical address space independently of one another in one or more blocks of the sub-set.

6. A memory apparatus according to claim 5, wherein the mapping control circuit is configured to store the versions of the mapping table parts for different ones of the segments mixed with one another in the first one of the blocks, to write a new version of the mapping table part for at least one of the segments into the second one of the blocks and to copy latest versions of the mapping table parts for which no versions are stored in the second one of the blocks of the subset into the second one of the blocks from the first one of the block before erasing the first one of the blocks.

7. A memory apparatus according to claim 5, wherein the mapping control circuit configured to store the versions of the mapping table parts for different ones of the segments in respective different blocks of the subset, the second one of the blocks being a spare block other than the respective different blocks, the mapping control circuit being configured to use the first one of the blocks as the spare block for replacing any one of the respective different blocks of the subset for the mapping table parts, after erasing the first one of the blocks.

8. A memory apparatus according to claim 1, wherein the mapping control circuit is configured to maintain a chain of pointers, stored in respective ones of the blocks, each non-final pointer pointing to a respective block that contains a next block in the chain, a final pointer in the chain pointing to a block from the subset.

9. A memory apparatus according to claim 1, wherein the mapping control circuit is configured to maintain a chain of pointers, stored in respective ones of the blocks, each non-final pointer in the chain pointing to a respective block that contains a next block in the chain, a final pointer in the chain pointing to a block containing at least part of a mapping table for mapping logical addresses to respective ones of the blocks or groups of blocks, the pointing information comprising at least one of the pointers.

10. A memory apparatus according to claim 1, wherein the mapping control circuit is configured to maintain a tree of pointers, each non-final pointer in the tree pointing to a respective block that contains a next block in the tree, final pointers in the tree pointing to respective ones of the blocks from the subset, first and second ones of the pointers being stored in mutually different ones of the blocks at least when the first pointers point to blocks containing the second pointers.

11. A memory apparatus according to claim 1, wherein each version of the pointing information comprises information identifying used blocks among the physical blocks, that are assigned to respective functions, and further information identifying free blocks among the physical blocks that are free from assignment at the time of generation of the version, the mapping control circuit being arranged to use the further information to select the free blocks to replace the used blocks and to use the further information from the main memory to search at least one of the free blocks on start up to determine whether any one of the used blocks has been replaced by the at least one of the free blocks.

12. A memory apparatus according to claim 1, wherein the main memory is a flash memory.

13. A memory apparatus according to claim 1, comprising a RAM memory, the mapping control circuit being configured to store a direct pointer that points directly to the latest version of the pointing information in the RAM memory and to use the direct pointer to locate the pointing information during an operation subsequent to start up.

14. A method of operating a non-volatile main memory that comprises a plurality of physical blocks of memory locations, the main memory supporting erasing of at least a physical block at a time, the method comprising:
storing pointing information in a subset of the blocks for use to identify respective ones of the physical blocks that are assigned to respective functions,
identifying the subset of the blocks;
storing successive versions of the pointing information at mutually different memory locations initially in a first block in the subset;
storing a subsequent version of the pointing information that is more recent than the successive versions in a second block of the subset at least after the first block has been filled;
erasing the first block after storing the subsequent version; and
recovering the pointing information at least on start up of the main memory by testing which of the blocks of the subset contains a most recent version of the pointing information, by
searching in the subset for a partly filled block that has only partly been written, and
if a partly filled block is found, using a last written version of the pointing information from the partly filled block, and
using a last written version of the pointing information from a full block if no partly filled block is found.

15. The method of claim 14, wherein storing a subsequent version of the pointing information includes storing a subsequent version of all of the pointing information in the first block.

16. The method of claim 14, wherein recovering the pointing information at least on start up of the main memory includes,
for other pointing information not in the partly filled block, using a last written version of the other pointing information from a full block.

17. A memory apparatus according to claim 1, wherein the mapping control circuit is configured and arranged to erase the first one of the blocks in response to storing the first version of the pointing information in the second one of the blocks.

18. A memory apparatus according to claim 1, wherein the mapping control circuit is configured and arranged to erase the first one of the blocks in response to storing the first version of the pointing information in the second one of the blocks, and prior to storing a subsequent updated version of the pointing information in another one of the blocks.

19. A memory apparatus according to claim 1, wherein the mapping control circuit is configured and arranged to erase the first block after storing the subsequent version by erasing the first block in response to the subsequent version being stored in the second block.

20. An apparatus comprising:
a non-volatile memory circuit including a plurality of physical blocks of memory locations, the memory circuit being configured and arranged to erase a physical block at a time; and
a mapping control circuit configured and arranged with the non-volatile memory circuit to:
maintain pointing information that identifies respective ones of the physical blocks that are assigned to respective functions,
store successive versions of the pointing information in first and second ones of a subset of the physical blocks,
store, in the second one of the physical blocks, a first version of all of the pointing information stored in the first one of the blocks, the first version being not less recent than any of the pointing information in the first one of the blocks,
after storing the first version of all of the pointing information stored in the first one of the blocks, erasing all of the pointing information in the first one of the blocks, and
recover the pointing information at least on start up of the non-volatile memory circuit by testing which physical block of the defined subset contains a most recent version of the pointing information.

* * * * *